Nov. 23, 1926.  
C. S. HENSEL ET AL  
1,608,395  
STEAM BASTING ATTACHMENT FOR BAKING PANS  
Filed April 14, 1925

INVENTORS  
Charles S. Hensel  
BY Herbert A. Munzenberger

Geo. P. Kimmel ATTORNEY.

Patented Nov. 23, 1926.

1,608,395

UNITED STATES PATENT OFFICE.

CHARLES SUMNER HENSEL AND HERBERT A. MUNZENBERGER, OF CHICAGO, ILLINOIS.

STEAM BASTING ATTACHMENT FOR BAKING PANS.

Application filed April 14, 1925. Serial No. 23,024.

This invention relates to a steam basting attachment for baking pans, and has for its object to provide, in a manner as hereinafter set forth, an attachment of such class for positioning within a baking pan and constructed and arranged whereby provision is made for transforming a liquid into steam for distribution over the food which is being baked to provide a basting effect thereon.

With these and other objects in view, the invention consists in certain novel features of construction as hereinafter shown and described and then specifically pointed out in the claims, and in the drawings illustrative of the preferred embodiment of the invention—

Figure 1:
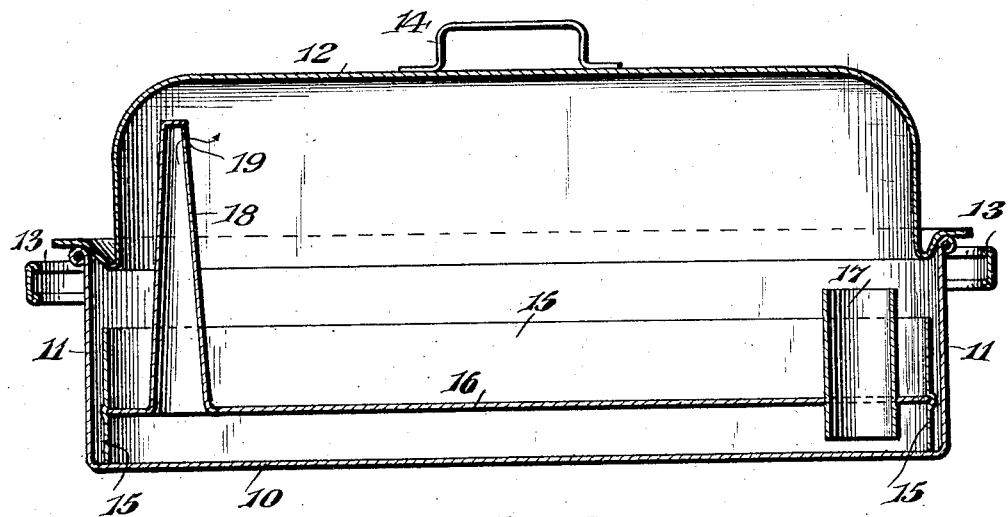
Figure 1 is a longitudinal sectional view of a baking pan showing the adaptation therewith of a steam basting attachment in accordance with this invention.
Figure 2:
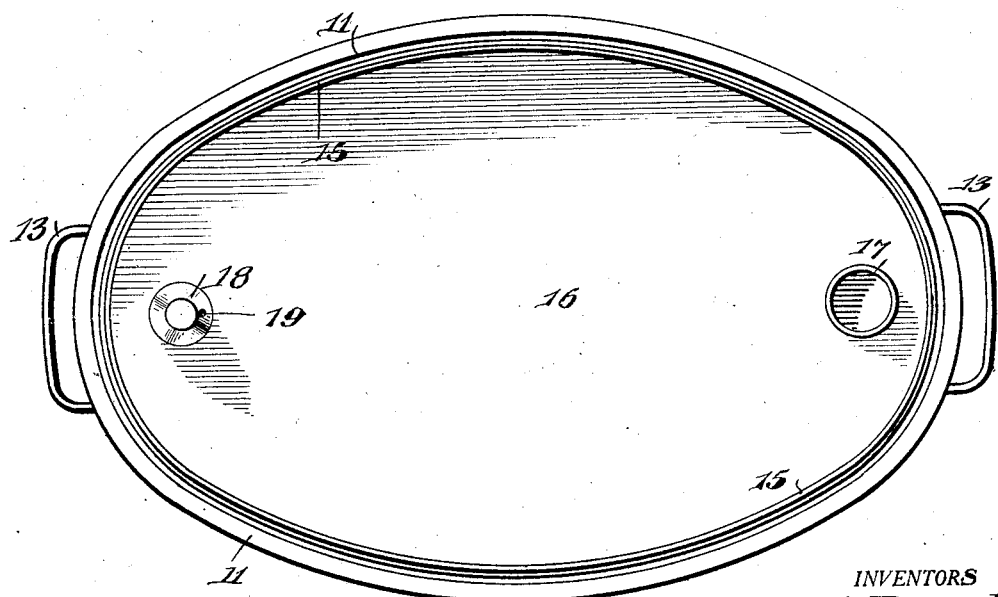
Figure 2, is a top plan view of the pan, with its cover removed, and showing a plan of the attachment, in accordance with this invention, within the pan.

In the drawings there is illustrated by way of example a baking pan of substantially elliptical contour, and which comprises a bottom 10, a body portion 11 connected to the latter, and a detachable cover or closure 12.

A steam basting attachment in accordance with this invention will preferably conform to the shape of the baking pan, and is removably mounted upon the upper face of the bottom of the latter. The attachment is of a height less than the height of the pan when the cover of the latter is in closure position.

A steam basting attachment in accordance with this invention comprises a vertically disposed endless shell 15 of the same contour as the body portion 11 and which is seated on the bottom 10. The shell 15 is of less height than and spaced a substantial distance from the body portion 11.

Secured within the shell 15, intermediate the top and bottom edges thereof is a partition 16 having its edge throughout engaging the inner face of the shell. The partition 15 conforms in contour to the shape of the shell and in connection with the latter provides the bottom of an open top food receiving compartment and the top of an open bottom water receiving compartment.

Extending through, as well as being secured to the partition 16, near one end, is a vertically extending filling tube 17 for the water compartment. The tube 17 extends above the shell 15 and has its lower end arranged above the bottom edge of the shell.

Secured at its lower end to the partition 16, in proximity to the other end thereof, as well as opening into the top of the water compartment is a vertically extending tapered steam discharging nozzle 18, which is closed at its top and formed in its side in proximity to its top with a discharge port 19. The top of the nozzle 18 is positioned in proximity to the closure 12.

The baking pan is illustrated for the purpose of showing the adaptation therewith of an attachment, in accordance with this invention, for basting purposes.

The food to be baked is positioned upon the partition 16. Water is then supplied to the water compartment through the tube 17. The food is positioned on the partition after the attachment is mounted upon the bottom of the baking pan, and such bottom acts as a closure for the bottom of the water compartment. After the water has been supplied, the pan is closed, and during the cooking or baking operation the heat therefrom will cause the generation of steam and the latter will pass up the nozzle 18, and be discharged therefrom through the port 19 upon the cooking or baking food under such conditions providing for a basting effect upon the latter.

The improved device is simple in construction, can be inexpensively manufactured and of any size or capacity.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described our invention what we claim as new is:

1. A steam basting attachment for baking pans comprising an endless shell, a partition arranged therein intermediate the top and bottom of the shell and having its edge abutting throughout the inner face of the latter, said partition in connection with said shell forming an open top food receiving compartment and an open bottom water receiving compartment, a water filling tube secured to said partition near one end thereof, extending above said shell and depending partly through said water compartment, and a steam discharge nozzle secured at its lower end to the upper face of said partition in proximity to the other end of the latter, said nozzle opening at its lower end into the top of said water compartment, having a closed top and formed with a discharge port in the side thereof.

2. A steam basting attachment for baking pans comprising an endless shell, a partition arranged therein intermediate the top and bottom of the shell and having its edge abutting throughout the inner face of the latter, said partition in connection with said shell forming an open top food receiving compartment and an open bottom water receiving compartment, a water filling tube secured to said partition near one end thereof, extending above said shell and depending partly through said water compartment, and a steam discharge nozzle secured at its lower end to the upper face of said partition in proximity to the other end of the latter, said nozzle opening at its lower end into the top of said water compartment, having a closed top and formed with a discharge port in the side thereof in proximity to said closed top, said nozzle projecting above said filling tube.

In testimony whereof, we affix our signatures hereto.

CHARLES SUMNER HENSEL.
HERBERT A. MUNZENBERGER.